No. 753,202. PATENTED FEB. 23, 1904.
H. H. MEYER.
CURTAIN ROD FIXTURE.
APPLICATION FILED NOV. 6, 1903.
NO MODEL.
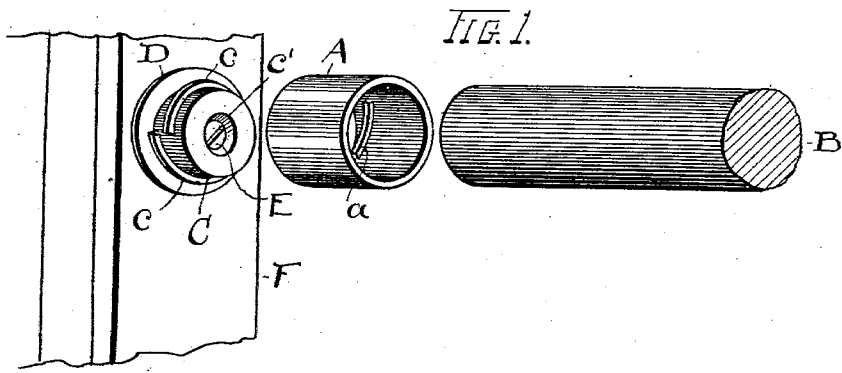
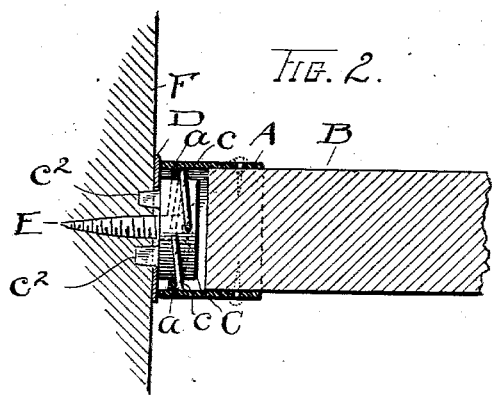
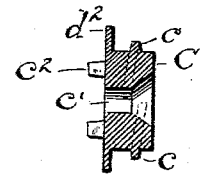
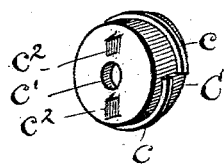
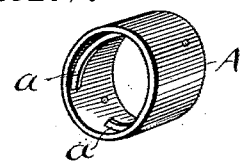
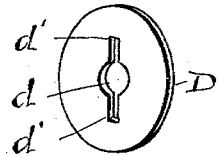
WITNESSES:
INVENTOR.
Hermann H. Meyer
BY
ATTORNEY.

No. 753,202. Patented February 23, 1904.

UNITED STATES PATENT OFFICE.

HERMANN H. MEYER, OF CLEVELAND, OHIO.

CURTAIN-ROD FIXTURE.

SPECIFICATION forming part of Letters Patent No. 753,202, dated February 23, 1904.

Application filed November 6, 1903. Serial No. 180,025. (No model.)

*To all whom it may concern:*

Be it known that I, HERMANN H. MEYER, a citizen of the United States, residing at Cleveland, in the county of Cuyahoga and State of Ohio, have invented certain new and useful Improvements in Curtain-Rod Fixtures; and I do declare that the following is a full, clear, and exact description of the invention, which will enable others skilled in the art to which it appertains to make and use the same.

My invention relates to curtain-rod fixtures; and the invention consists in the construction and combination of parts, substantially as described, and particularly pointed out in the claims.

In the accompanying drawings, Figure 1 is a perspective view of the three essential parts of my new improved fixture and an end piece of a curtain-rod in the relation, respectively, in which they are to be united; and Fig. 2 is a sectional elevation of said parts shown as united and in working postion. Fig. 3 is a perspective view of the stud member of the fixture adapted to be secured to the window-casing. Fig. 4 is a perspective view of the thimble for the curtain rod or pole, and Fig. 5 is a perspective view of the washer for protecting the casing. Fig. 6 is a sectional view of a modification of the stud member.

In the drawings thus shown the whole idea of the invention is to provide a simple, cheap, and effective fixture which any one can easily put up and connect and which is securely engaged and easily disengaged.

To these ends the invention is comprised in three parts—a thimble, ring, or sleeve A, adapted to be slipped over the end of the rod or pole B, a stud C to be fixed upon the window-casing, and a washer D, which comes beneath said stud.

The sleeve or thimble A is designed to be securely fastened upon rod or pole B by any suitable means or loosely sleeved thereon, and in its outer portion, which projects beyond the end of the rod B, is a quick thread or threads $a$, adapted to engage upon threads $c$ on stud C, so that about a quarter-turn of rod and sleeve on said stud will engage and disengage the same.

The stud member C is fashioned as a section of a rod, except as it has the threads $c$, a central bore $c'$ for fastening screw E, and two sharp teeth $c^2$ for engaging it in the casing or frame F of the window or other place.

The washer D is a plain disk provided with a central hole $d$ for the passage of screw E and lateral slots $d'$ to accommodate the teeth $c^2$.

It will be noticed that disk D is wider than both stud C and sleeve A, so that it affords a lateral bearing-surface all around beneath said stud, against which the edge of sleeve or thimble A comes when it is turned to locking position, and this protects the casing of the window from being marred by said edge.

The teeth $c^2$ on stud C prevent the stud from rotating when fastened by screw E and when the sleeve A comes to be tightened on the stud.

If preferred, a rim or flange $d^2$, Fig. 6, may be formed upon the stud about its base to take the place of the separate washer shown; but I prefer to use a washer or disk as a distinctly separate part and in the manner shown and described.

What I claim is—

1. In curtain-rod fixtures, a sleeve and a stud having corresponding quick-threads for engaging the sleeve upon the stud, and a metallic rim about the base of the stud projecting laterally beyond the stud all around, whereby a bearing is formed for the edge of said sleeve and the window-casing is protected, substantially as described.

2. In curtain-rod fixtures, a sleeve for the end of the rod provided with a quick-thread internally in its outer portion, a stud having a quick-thread externally adapted to engage in said sleeve, and spurs on the bottom of the stud to prevent its turning, and a washer having a central hole and slots coincident with the opening and spurs on the said stud and wider than the stud at its base, substantially as described.

3. A curtain-rod fixture consisting of a sleeve A having internal threads $a$, a stud C having threads $c$ to engage in said sleeve, and a washer D at the base of said stud extending outward beyond the stud all around, thereby forming a metallic bearing for the edge of sleeve A, substantially as described.

In testimony whereof I sign this specification in the presence of two witnesses.

HERMANN H. MEYER.

Witnesses:
R. B. MOSER,
V. KRYCI.